(12) United States Patent
Chung

(10) Patent No.: US 7,206,200 B2
(45) Date of Patent: Apr. 17, 2007

(54) MOUNTING DEVICE FOR HARD DISK DRIVES

(75) Inventor: Cheng-Kuang Chung Chung, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 250 days.

(21) Appl. No.: 10/988,322

(22) Filed: Nov. 12, 2004

(65) Prior Publication Data

US 2005/0195563 A1 Sep. 8, 2005

(30) Foreign Application Priority Data

Mar. 6, 2004 (CN) .................. 2004 2 0043498 U

(51) Int. Cl.
*G06F 1/16* (2006.01)

(52) U.S. Cl. .................. 361/685; 361/724; 211/26

(58) Field of Classification Search ................ 361/685, 361/724, 725, 726; 312/223.1; 211/26
See application file for complete search history.

(56) References Cited

U.S. PATENT DOCUMENTS 6,612,667 B2* 9/2003 Tsai et al. ................ 312/223.1
6,768,638 B2* 7/2004 Shih ........................... 361/685
6,775,132 B2* 8/2004 Chen et al. ................. 361/685
6,798,652 B2* 9/2004 Wang et al. ................ 361/685
2004/0173544 A1* 9/2004 Chen .......................... 211/26
2004/0190266 A1* 9/2004 Chung ........................ 361/724
2004/0257760 A1* 12/2004 Record et al. .............. 361/685

FOREIGN PATENT DOCUMENTS

TW 534439 5/2003

* cited by examiner

Primary Examiner—Lisa Lea-Edmonds
(74) Attorney, Agent, or Firm—Morris Manning & Martin LLP; Tim Tingkang Xia, Esq.

(57) ABSTRACT

A mounting device for mounting hard disk drives (10) includes a base (50), a bracket (40) mounted on the base, and a hard disk case (20) installed in the bracket. The bracket includes a plurality of clapboards (43). Each of the clapboards includes a plurality of guiding portions (423) formed thereon and a tab (421) stamped therefrom. The hard disk case includes a pair of guiding walls (24) and a latch (234). The guiding portions and the guiding walls cooperatively guide the hard disk case to correctly sliding into or out of the bracket. When the latch of the hard disk case is engaged with the tab of the bracket, the hard disk case together with the hard disk drive is locked in the bracket.

18 Claims, 6 Drawing Sheets

MOUNTING DEVICE FOR HARD DISK DRIVES

BACKGROUND OF THE INVENTION

1. Field of the Invention

The present invention relates to mounting devices for hard disk drives, and particularly to a mounting device that correctly and readily attaches a hard disk drive to a computer enclosure.

2. Description of Related Art

When designing a computer, many factors must be considered. Some technical considerations include the desired processor speed, the bus size, memory requirements, and the physical size of the computer enclosure. When positioning components within the computer enclosure, it is desirable to position some components such that they are easily removable and assembled by a user or a technician. An example of such a component is a hard disk drive. Conventionally, the hard disk drive is directly secured to a bracket of the computer enclosure using screws. This hard disk drive installation method substantially increases operating time and cost because of the complexity and difficulty of assembly or disassembly processes.

A common way to overcome the above shortcomings is that a hard disk drive is first mounted to a mounting device, then the mounting device is attached to a computer enclosure. TW Pat. Publication No. 534439 discloses such a mounting device. The mounting device comprises a mother case and a daughter case slidably attached to the mother case. A hard disk drive is installed in the daughter case. A first circuit board is mounted to the mother case. A second circuit board is attached to the daughter case, for engaging with the first circuit board.

While this mounting device reduces the cost of installing the hard disk device in the computer enclosure and subsequently removing the hard disk device for service and replacement, it also increases the difficulty of the first circuit board correctly engaging with the second circuit board because the mounting device has no proper mechanism to prevent the first circuit board from incorrectly engaging with the second circuit board.

A new mounting device for hard disk drives that overcomes the above-mentioned problems is desired.

SUMMARY OF THE INVENTION

An object of the present invention is to provide a mounting device which can readily and correctly attach hard disk drives to a computer enclosure.

In order to achieve the above object, a mounting device for mounting hard disk drives in accordance with a preferred embodiment of the present invention comprises a base, a bracket mounted on the base, and a hard disk case installed in the bracket. The bracket comprises a plurality of clapboards and a plurality of receiving spaces bounded by every two of adjacent clapboards. A plurality of guiding portions is stamped from each of the clapboards. A tab is stamped from each of the clapboards. The hard disk case comprises a pair of guiding walls and a latch. The guiding portions and the guiding walls cooperatively guide the hard disk case to correctly sliding into or out of the bracket. When the latch of the hard disk case is engaged with the tab of the bracket, the hard disk case together with the hard disk drive is locked in the bracket.

Other objects, advantages and novel features of the present invention will become more apparent from the following detailed description when taken in conjunction with the accompanying drawings, in which:

DESCRIPTION OF THE PREFERRED EMBODIMENT

Reference will now be made to the drawings to describe the present invention in detail.

Figure 1:
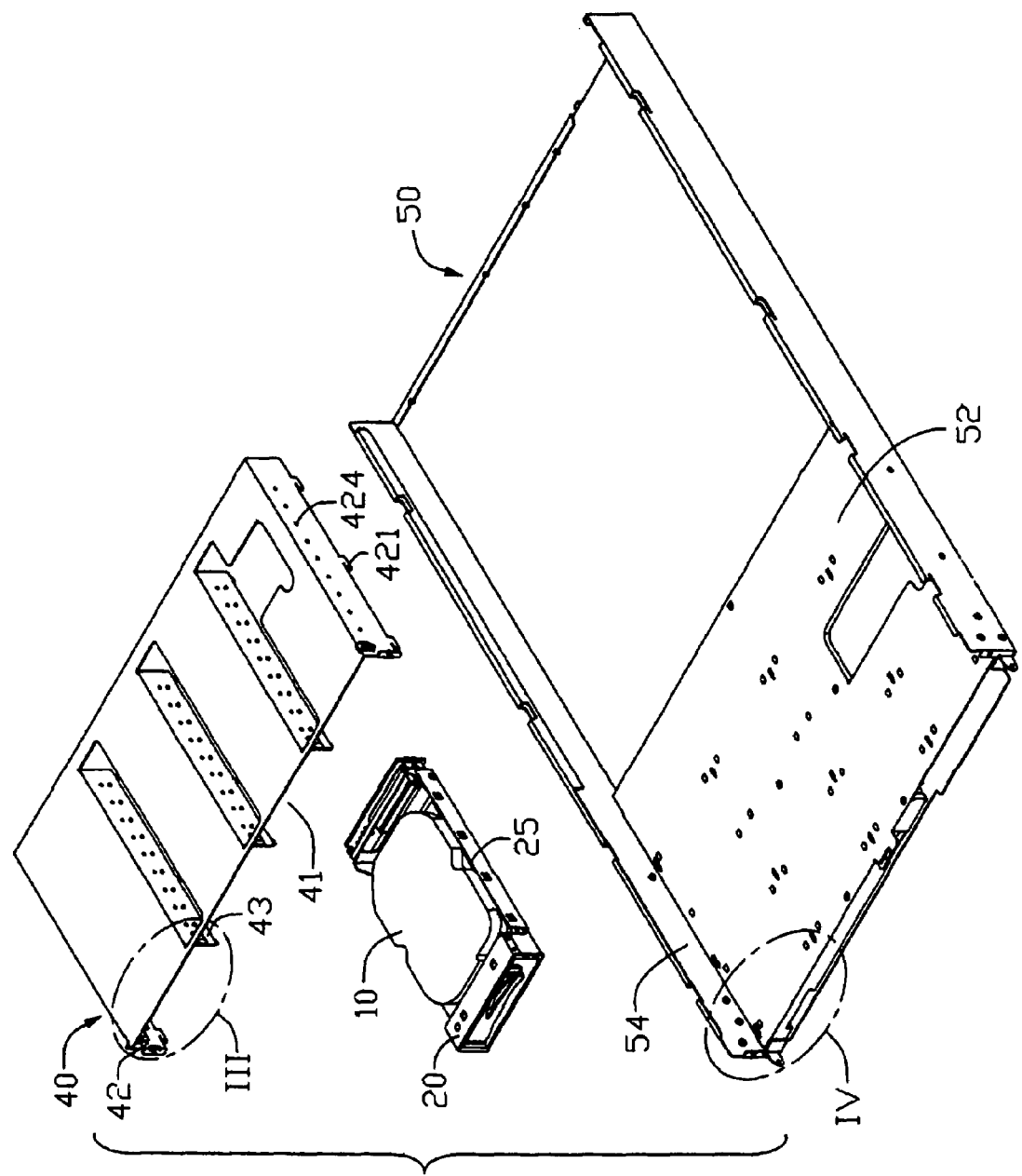
FIG. 1 is an exploded, isometric view of a mounting device in accordance with a preferred embodiment of the present invention, together with a hard disk drive and a first connector assembly mounted to a hard disk case of the mounting device.

FIG. 1 shows a mounting device of an electronic apparatus like a computer in accordance with a preferred embodiment of the present invention, together with a hard disk drive 10 as an inner device of the computer and a first connector assembly 30 (Referring to FIG. 2) to connect the hard disk drive 10 with other parts of the computer. The mounting device comprises a hard disk case 20, a bracket 40 and a base 50.

Figure 2:
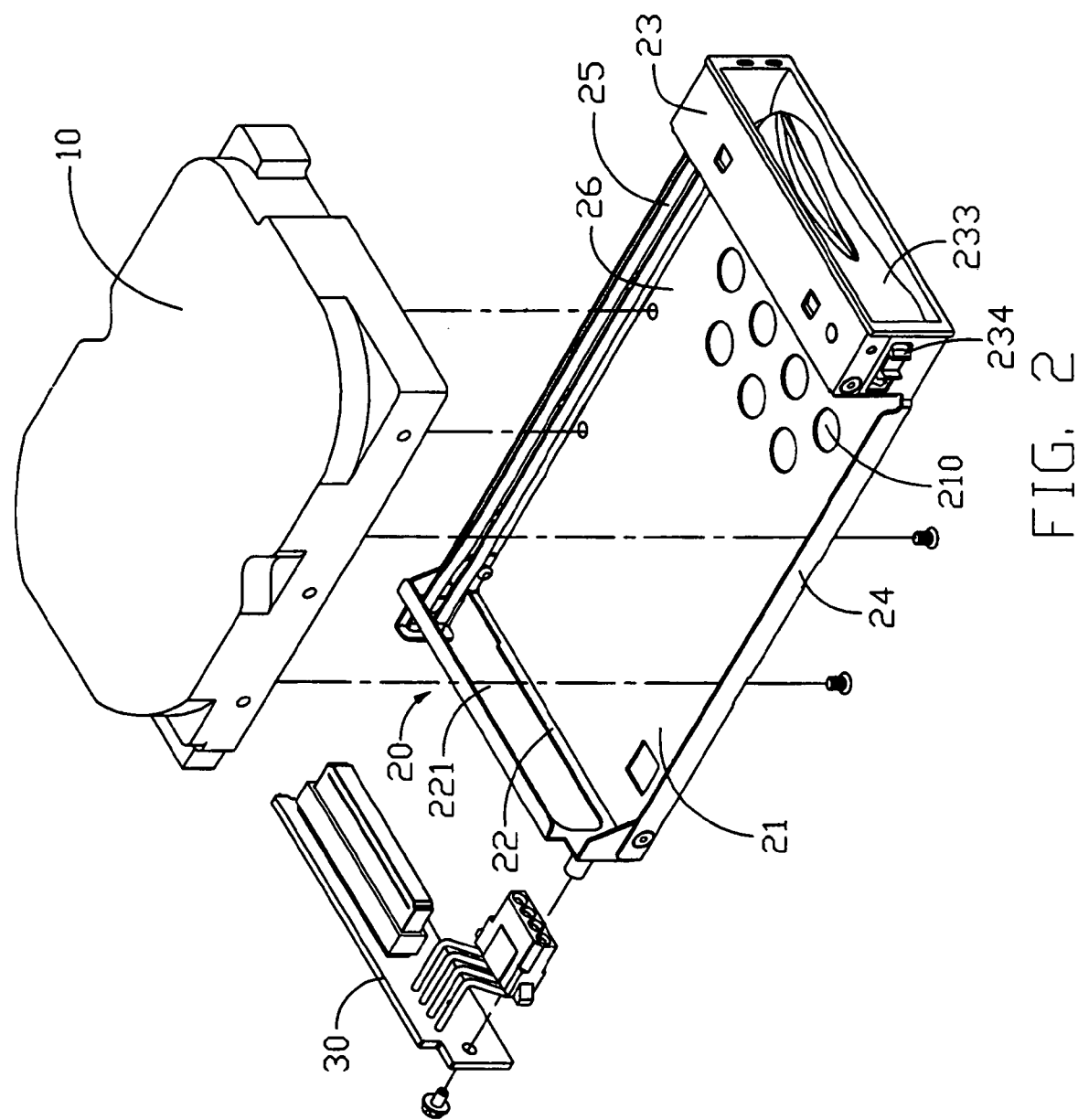
FIG. 2 is an exploded, enlarged view of the hard disk drive, the first connector assembly and the hard disk case of FIG. 1, but viewed from another aspect.
Figure 6:
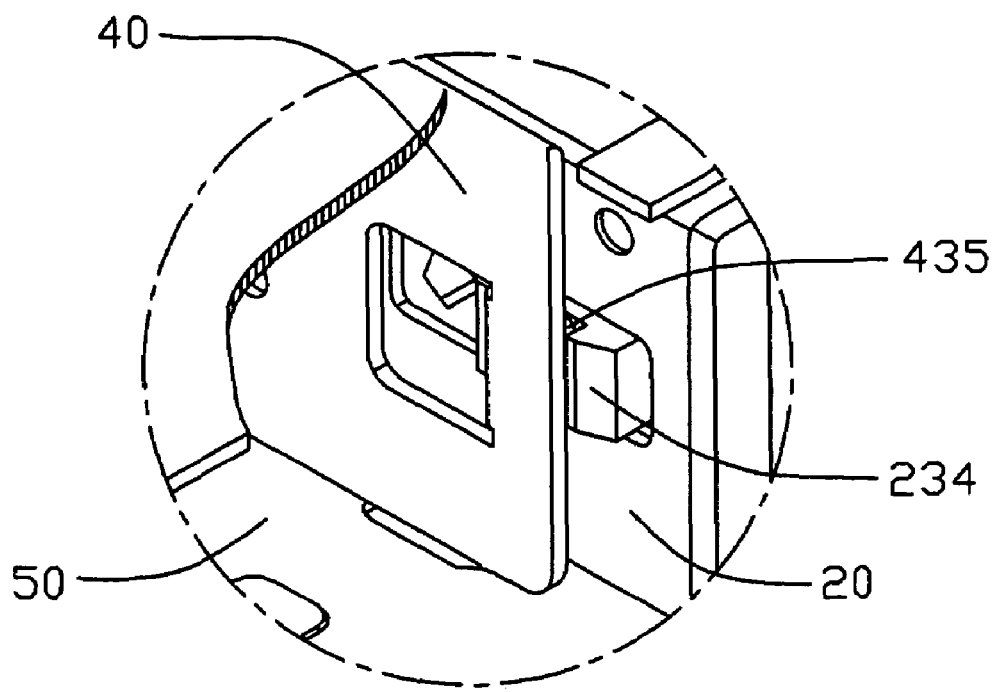
FIG. 6 is an enlarged view of a circle portion VI of FIG. 5.
Figure 7:
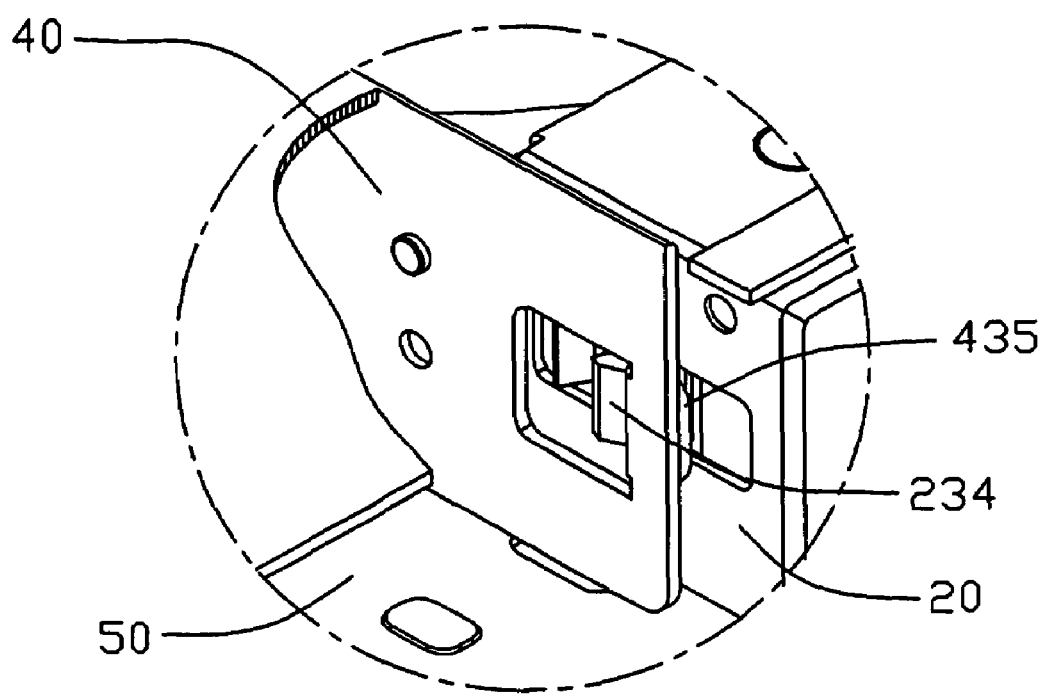
FIG. 7 is an enlarged view of a circle portion VII of FIG. 5.

Referring also to FIG 2, the hard disk case 20 comprises a first guiding wall 24, a second guiding wall 25, a first end wall 23 interconnecting to the first and second guiding walls 24, 25, a second end wall 22 opposite to the first end wall 23, and a bottom wall 21. A space 26 is bounded by the bottom wall 21, the first and second end walls 23, 22, and the first and second guiding walls 24, 25, for receiving the hard disk drive 10. A height of the second guiding wall 25 is greater than that of the first guiding wall 24. A plurality of vents 210 is defined in the bottom wall 21, adjacent to the first end wall 23. The second end wall 22 defines a receiving groove 221, for facilitating the first connector assembly 30 engaging with the hard disk drive 10. The first end wall 23 comprises a handle 233 formed in a front thereof, and a U-shaped latch 234 adjacent to the first guiding wall 24. Referring also to FIGS. 6 and 7, when the handle 233 is drawn out, the latch 234 is defined in an open state. When the handle 233 is pushed in, the latch 234 is defined in a closed state.

Figure 3:
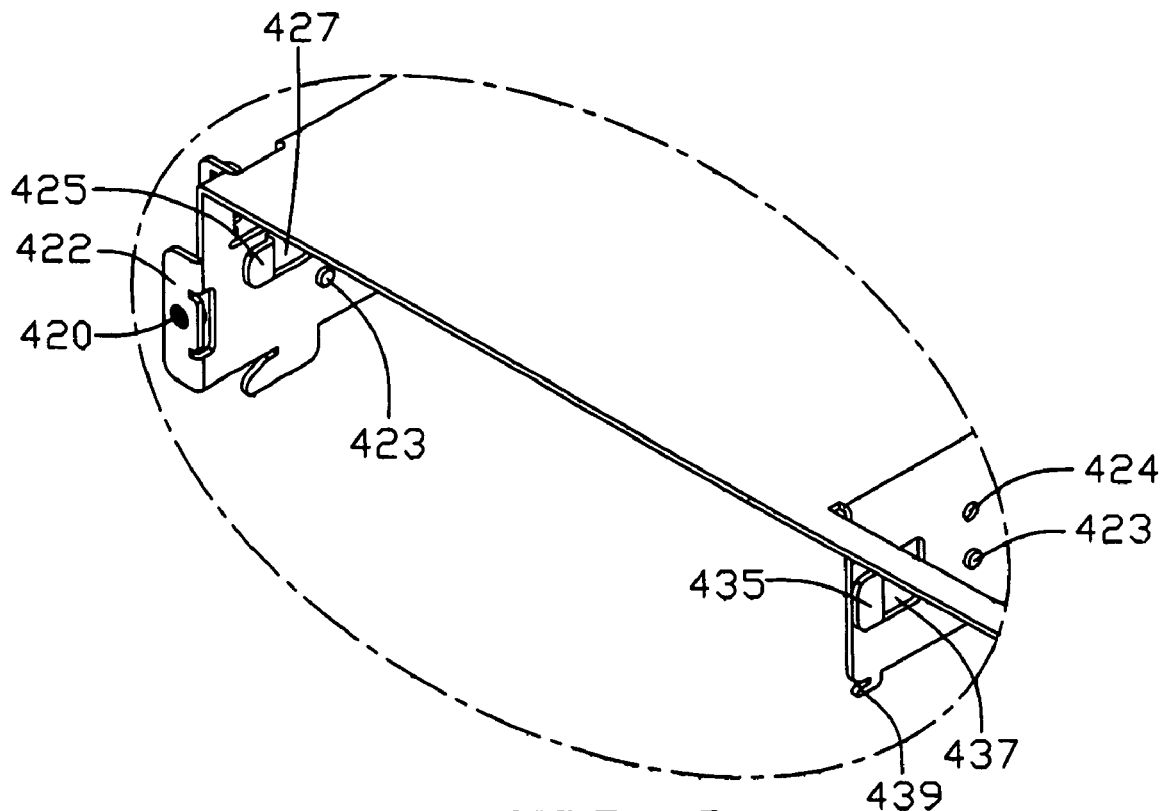
FIG. 3 is an enlarged view of a circle portion III of FIG. 1.

Referring to FIGS. 1 and 3, the bracket 40 is adapted for mounting the hard disk cases 20. The bracket 40 comprises a pair of opposite outer clapboards 42, a plurality of inner clapboards 43, and a backboard (not shown). A plurality of second connector assemblies (not shown) is mounted to the backboard. A plurality of receiving spaces 41 is defined between adjacent clapboards. The hard disk case 20 is received in one of the receiving spaces 41. Each of the outer clapboards 42 has three first barbs 421 extending from a bottom edge thereof, and a first retaining portion 422 bending outwardly from a front end thereof. A first mounting hole 420 is defined in the first retaining portion 422. A row of first guiding portions 423 is stamped from a lower portion of one of the outer clapboard 42. A row of second guiding portions 424 is stamped from an upper portion of the other outer clapboard 42. A first tab 425 is stamped inwardly from each outer clapboard 42, thereby a first aperture 427 is defined in each outer clapboard 42. The first tab 425 is adjacent to the first retaining portion 422. A row of the first guiding portion 423 is stamped from a lower portion of each of the inner clapboards 43. A row of the second guiding portion 424 is stamped from an upper portion of each of the inner clapboards 43. The first and second guiding portions 423, 424 on the same inner clapboard 43 are protruded on opposite sides of said inner clapboards 43. A second tab 435 is stamped from a front of each of the inner clapboards 43, thus a second aperture 437 is defined right next to the second tab 435. Three second barbs 439 extend downwardly from a bottom edge of each of the inner clapboards 43.

Figure 4:
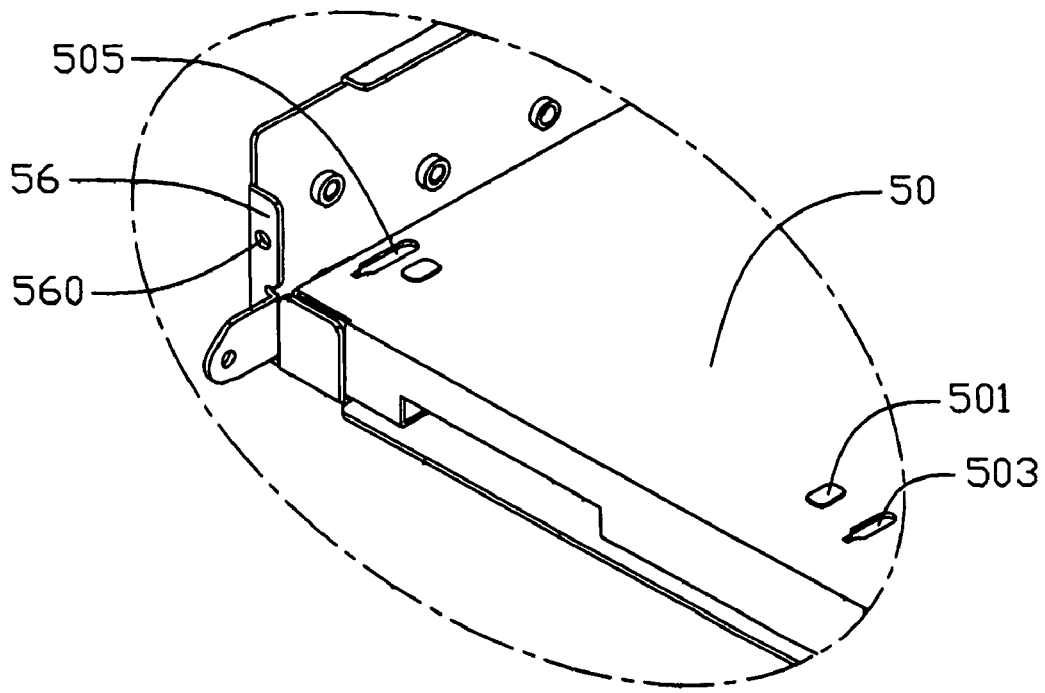
FIG. 4 is an enlarged view of a circle portion IV of FIG. 1.
Figure 5:
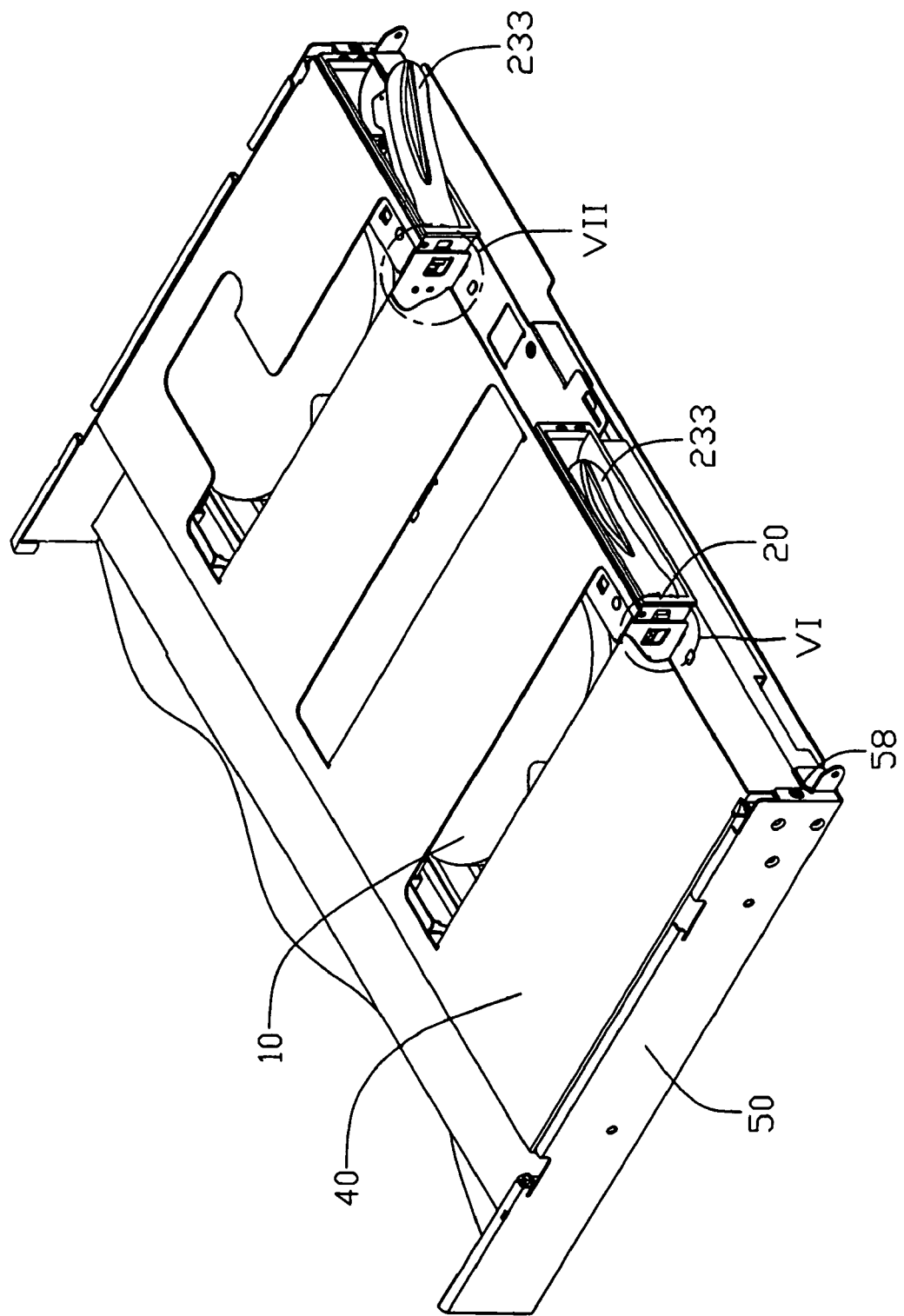
FIG. 5 is an enlarged, assembled view of FIG. 1.

Referring to FIGS. 1 and 4, the base 50 is adapted for installing the bracket 40. The base 50 comprises a bottom wall 52 and a pair of opposite sidewalls 54. A plurality of rows of projections 501 protrudes upwardly from the bottom wall 52, for facilitating the hard disk case 20 sliding on the bottom wall 52. Two rows of first slots 505 are respectively defined in opposite ends of the bottom wall 52, for receiving the first barbs 421 of the bracket 40. A plurality of rows of second slots 503 is defined in the bottom wall 52, corresponding to the second barbs 439 of the bracket 40. A second retaining portion 56 bends inwardly from a front end of each of the sidewalls 54. A second mounting hole 560 is defined in the second retaining portion 56, corresponding to the first mounting hole 420 of the bracket 40.

In pre-assembly, the hard disk drive 10 is mounted into the space 26 of the hard disk case 20. The first connector assembly 30 engages with the hard disk drive 10 through the receiving groove 221 of the hard disk case 20. The handle 233 of the hard disk case 20 is drawn out of the hard disk case 20, and the latch 234 is in the open state.

Referring to FIGS. 1–5, in assembly, the first and second barbs 421, 439 of the bracket 40 are respectively received in the first and second slots 505, 503 of the base 50. A screw 58 is fastened in the first mounting hole 420 of the bracket 40 through the second mounting hole 560 of the base 50, the bracket 40 is thereby attached to the base 50. The first guiding portions 423 of the bracket 40 slidably abut against top edges of the first guiding wall 24 of the hard disk case 20. The second guiding portions 424 of the bracket 40 slidably abut against top edges of the second guiding wall 25 of the hard disk case 20. The first and second guiding portions 423, 424 of the bracket 40 guide the hard disk case 20 into the receiving space 41 of the bracket 40, and the first connector assembly 30 engages with the second connector assembly. Pushing the handle 233 of the hard disk case 20 into the case 20 causes the latch 234 of the hard disk case 20 to be in the closed state, the latch 234 engages with opposite sides of the first tab 425 or the second tab 435 of the bracket 40. Thus, the hard disk case 20 together with the hard disk drive 10 is installed within the bracket 40. Then, the hard disk case 20, the hard disk drive 10, and the bracket 40 are mounted to a computer enclosure (not shown).

In disassembly, drawing the handle 233 of the hard disk case 20 causes the latch 234 of the hard disk case 20 to be in the open state, i.e., the latch 234 disengages from the first tab 425 or the second tab 435 of the bracket 40. The first and second guiding portions 423, 424 of the bracket 40 guide the hard disk case 20 out of the receiving space 41 of the bracket 40.

Because the first and second guiding portions 423, 424 of the bracket 40 and the first and second guiding walls 24, 25 of the hard disk case 20 cooperatively guide the hard disk case 20 to correctly sliding into the bracket 40, the first connector assembly 30 is protected from incorrectly engaging with the second connector assembly.

Figure 8:
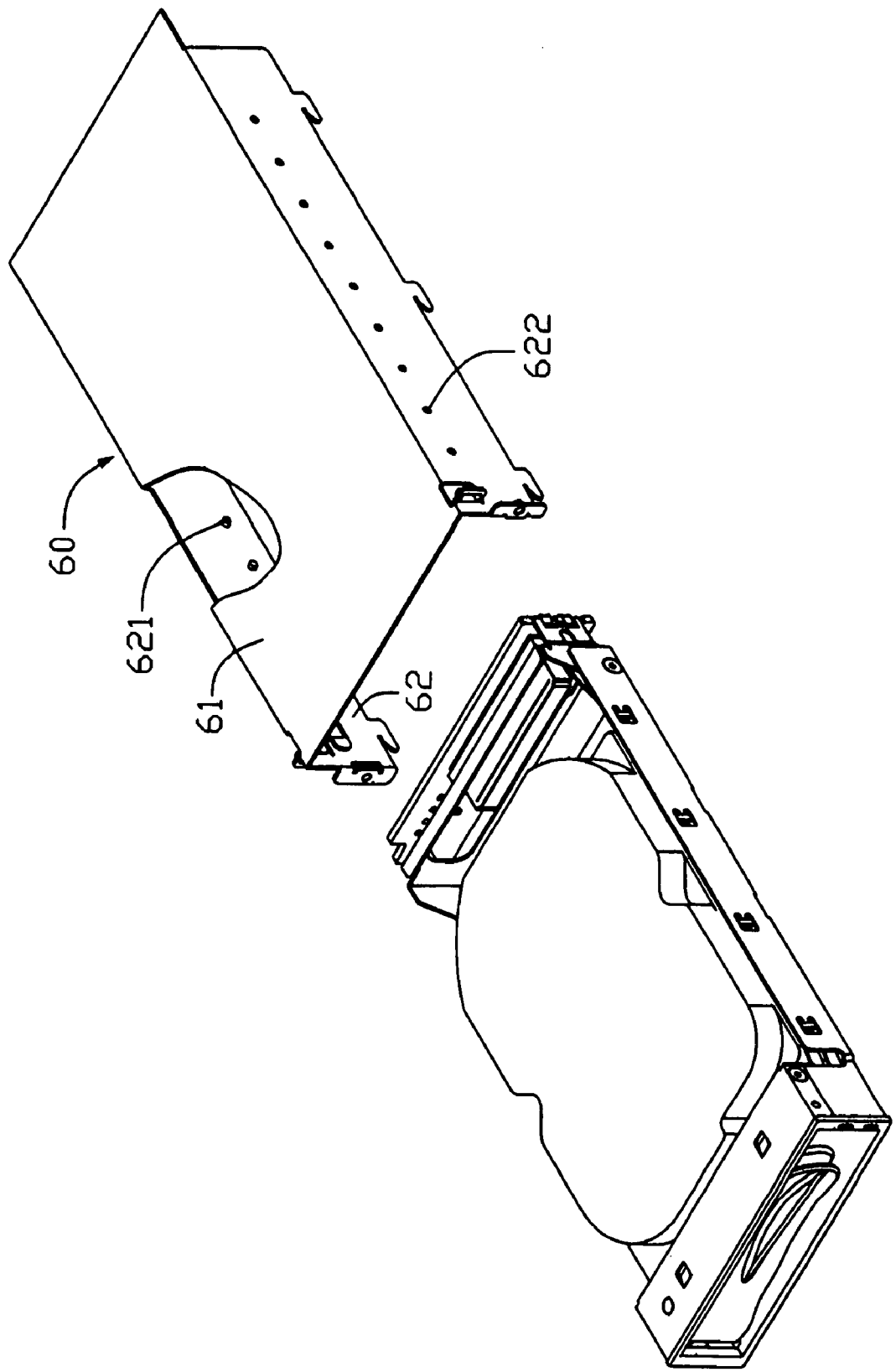
FIG. 8 is an exploded, isometric view of a mounting device in accordance with an alternative embodiment of the present invention, together with a hard disk drive.

Referring to FIG. 8, a bracket 60 in accordance with an alternative embodiment of the present invention has structures similar to that of the bracket 40 of the preferred embodiment. Compared with the bracket 40 of the preferred embodiment, the bracket 60 is adapted for receiving one hard disk case 20 (referring to FIG. 1). The bracket 60 defines a receiving space 63 bounded by a top wall 61 and a pair of opposite sidewalls 62. A row of first guiding portions 621 is formed in an upper portion of one of the sidewalls 62. A row of second guiding portions 622 is formed in a lower portion of the other sidewall 62. The bracket 60 of the alternative embodiment performs substantially the same functions as the bracket 40 of the preferred embodiment.

While preferred embodiments in accordance with the present invention have been shown and described, equivalent modifications and changes known to persons skilled in the art according to the spirit of the present invention are considered within the scope of the present invention as defined in the appended claims.

What is claimed is:

1. A mounting device for mounting at least one hard disk drive, the mounting device comprising:
   a base;
   a bracket mounted on the base, the bracket comprising a plurality of clapboards, a plurality of guiding portions formed on the clapboards;
   at least one hard disk case adapted for receiving said hard disk drive, said hard disk case comprising a pair of opposite guiding walls with different heights, the guiding walls and the guiding portions of the bracket cooperatively guiding said hard disk case into or out of the bracket;
   a first retaining portion bending from each of the clapboards located in opposite outer sides of the bracket and defining a first mounting hole; and
   a second retaining portion bending from each of sidewalls of the base and defining a second mounting hole corresponding to the first mounting hole.

2. The mounting device as described in claim 1, wherein a plurality of projections protrudes from the base, for facilitating said hard disk case sliding on the base.

3. The mounting device as described in claim 1, wherein a plurality of slots is defines in the base, and the clapboards of the bracket have a plurality of barbs received in the corresponding slots.

4. The mounting device as described in claim 1, wherein a tab is stamped from each of the clapboards of the bracket.

5. The mounting device as described in claim 4, wherein said hard disk case comprises a latch and a handle for causing the latch to engage with or disengage from the tab of the bracket.

6. A mounting device assembly for receiving an inner device of an electronic apparatus, comprising:
   a base;
   a bracket attached to said base to form at least one receiving space between said base and said bracket, and comprising first and second guiding portions at two opposite sides of said at least one receiving space respectively, and a tab extending from one of said two opposite sides of said at least one receiving space; and a case for receiving said inner device therein being movable into and resting in said at least one receiving space, said case comprising a corresponding wall to each of said first and second guiding portions, and distinguishable engagement of said corresponding wall with said each of said first and second guiding portions being established due to movement of said case into said at least one receiving space in a predetermined way, a handle and a latch formed in said case, wherein when said handle is pushed in, said latch engages with opposite sides of said tab to secure said case in said at least one receiving space, when said handle is drawn out, said latch disengages from said tab to release said case.

7. The mounting device assembly as described in claim 6, wherein a plurality of projections protrudes upward from said base so as to slidably support said case moving thereon.

8. The mounting device assembly as described in claim 6, wherein a plurality of slots is defined in said base, and said bracket has a plurality of barbs for being received in the corresponding slots to fix said bracket to said base.

9. The mounting device assembly as described in claim 6, wherein the latch has a U-shape.

10. The mounting device assembly as described in claim 6, wherein a clapboard is formed beside said at least one receiving space from said bracket for separating, said first and second guiding portions are formed on different one of said clapboard respectively, said clapboard is definable as an outer clapboard and an inner clapboard respectively.

11. The mounting device assembly as described in claim 10, wherein each inner clapboard has a row of said first guiding portions and a row of said second guiding portions formed on opposite sides thereof, and said row of said first guiding portions is in a lower level tan said second guiding portions away from said base.

12. The mounting device assembly as described in claim 10, wherein one outer clapboard has a row of said first guiding portions formed in a level away from said base while another outer clapboard has a row of said second guiding portions formed in a higher level away from said base than said first guiding portions.

13. The mounting device assembly as described in claim 12, wherein a first retaining portion is bent from said one outer clapboard, and a first mounting hole is defined in said first retaining portion.

14. The mounting device assembly as described in claim 13, wherein a second retaining portion is bent from a sidewall of said base located next to said one outer clapboard, and a second mounting hole is defined in said second retaining portion corresponding to said first mounting hole.

15. The mounting device assembly as described in claim 6, wherein the tab is stamped inwardly from one of the clapboards so as to leave an aperture in the clapboard beside the tab.

16. A mounting device assembly comprising:

a base;

a plurality of electronic devices each having two opposite side walls with different heights;

a bracket mounted on the base, the bracket comprising a plurality of parallel clapboards, a receiving space defined between every two neighboring clapboards adapted for receiving a corresponding electronic device, two parallel guiding portions stamped from each of the clapboards in two opposite directions respectively with one above the other;

a first retaining portion bending from each of the clapboards located in opposite outer sides of the bracket and defining a first mounting hole; and a second retaining portion bending from each of sidewalls of the base and defining a second mounting hole corresponding to the first mounting hole;

wherein the electronic devices slide in the receiving spaces respectively, with the guiding portions of the bracket retaining side walls of the electronic devices for proper insertion of the electronic devices.

17. The mounting device assembly as recited in claim 16, wherein the bracket comprises two opposite outer clapbbards sandwiching said parallel clapboards therebetween, a lower guiding portion stamped inwardly from one of the outer clapboards, and a higher guiding portion stamped inwardly from the other one of the outer clapboards.

18. The mounting device assembly as recited in claim 16, wherein the guiding portions each comprise a row of protrusions.

* * * * *